United States Patent [19]
Butler

[11] Patent Number: 5,404,320
[45] Date of Patent: Apr. 4, 1995

[54] AUTOCORRELATION PROCESSING METHOD AND APPARATUS

[75] Inventor: Neal R. Butler, Acton, Mass.

[73] Assignee: Loral Infrared & Imaging Systems, Inc., Lexington, Mass.

[21] Appl. No.: 128,816

[22] Filed: Sep. 29, 1993

[51] Int. Cl.$^6$ .................... G06J 1/00; G06F 15/336
[52] U.S. Cl. ......................... 364/604; 364/728.07
[58] Field of Search ............ 364/604, 728.03, 728.07

[56] References Cited

U.S. PATENT DOCUMENTS

| | | | |
|---|---|---|---|
| 4,860,357 | 8/1989 | Avery | 364/728.07 |
| 4,965,759 | 10/1990 | Uchida et al. | 364/604 |

Primary Examiner—Tan V. Mai
Attorney, Agent, or Firm—Leone & Moffa

[57] ABSTRACT

Autocorrelation processing finds a series of equally spaced pulses and noise. Pulses that are very narrow with inter-pulsed durations of several hundred times the width of the pulse are processed. A threshold detector receives an input from a sensor, the sensor providing the pulses. The threshold detector enables a flip flop which receives the output of a free running counter. The output of the free running counter is sent to a buffer such as, for example, a first in, first out circular buffer. The events held in the buffer are processed later for further autocorrelation processing.

17 Claims, 1 Drawing Sheet

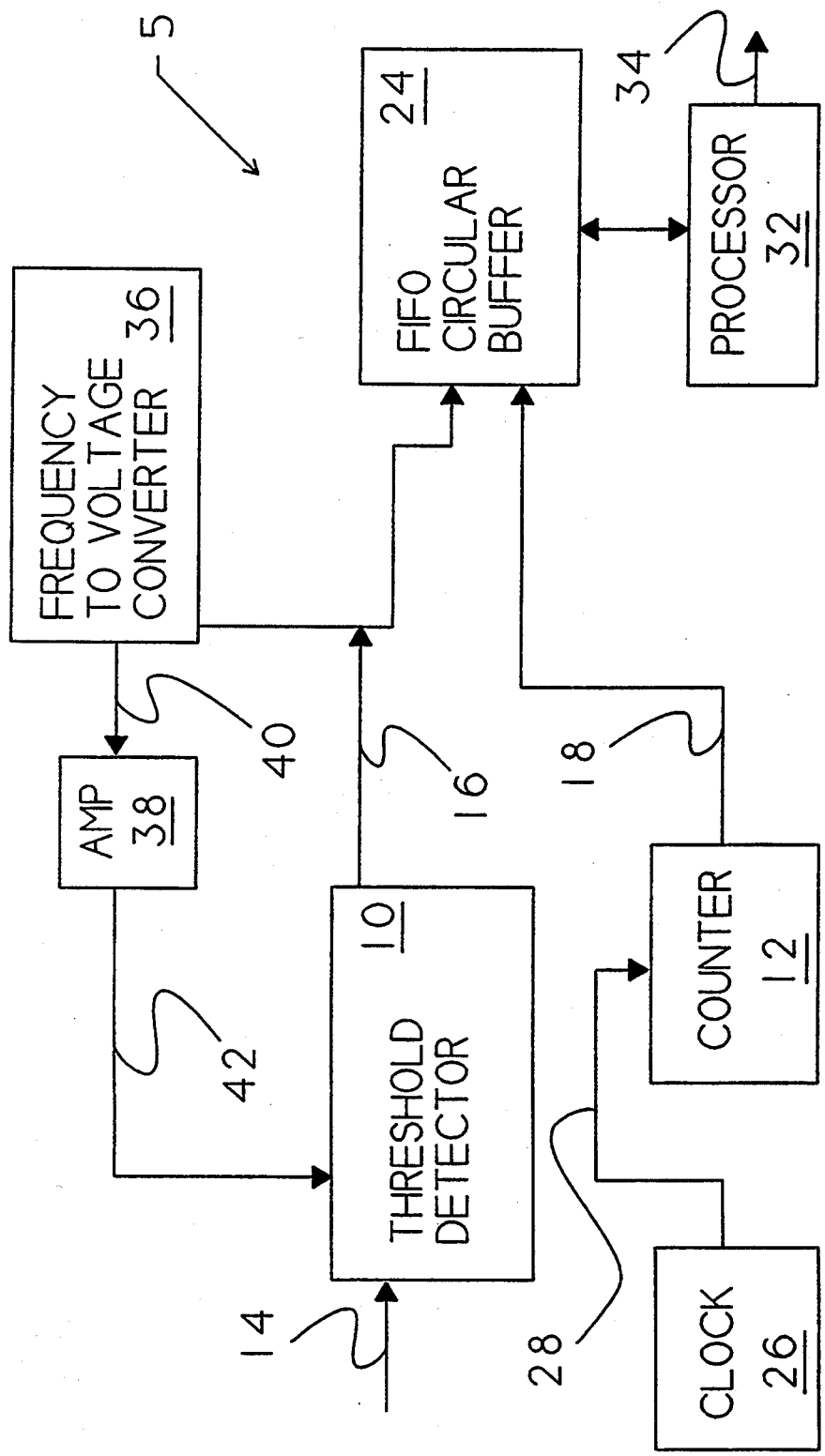

AUTOCORRELATION PROCESSING METHOD AND APPARATUS

This invention relates to the field of autocorrelation and in particular to a method of autocorrelation processing for finding a series of equally spaced pulses amongst noise, using a threshold detector, counter, flip-flop, and buffer.

BACKGROUND OF THE INVENTION

Autocorrelation is a classic technique for finding signals in the presence of noise. Prior art autocorrelation techniques involve delaying the signal by predetermined increments, multiplying the delayed signal by the incoming signal, averaging the result, and repeating the above steps for predetermined time delays. The prior art requires thousands of multiplications for every time period.

For certain applications, for example, applications relating to lasers, time periods are short, on the order of 50–100 nanoseconds. In such applications, the number of multiplications required for each time period exceeds the capabilities of prior art systems. The motivation of the invention is to provide a simpler, more cost effective autocorrelation method and apparatus which works as well as the prior art.

SUMMARY OF THE INVENTION

The present invention finds a series of equally spaced pulses amongst noise. The pulses can be very narrow and the interval between pulses may be several hundred times longer than the width of a pulse. Accordingly, the invention provides a threshold detector which receives an incoming signal. The threshold detector enables a flip-flop which simultaneously receives the output of a free running counter. The output of the free running counter value is sent to a buffer. Events detected by the threshold detector enable the flip-flop which captures the state of the free running counter so that a time stamp is matched with the output from the threshold detector. A plurality of signal states over time are held in the buffer for further autocorrelation processing.

BRIEF DESCRIPTION OF THE DRAWINGS

To illustrate this invention, a preferred embodiment will be described herein with reference to the accompanying drawings.

FIG. 1 shows a schematic block diagram of the method and apparatus of autocorrelation processing of the invention.

DETAILED DESCRIPTION OF THE PREFERRED EMBODIMENT

Now referring to FIG. 1, FIG. 1 shows the autocorrelation method and apparatus of the invention for processing an incoming detected signal on signal line 14. A threshold detector 10 has an incoming signal input from signal line 14 which carries the signal of interest. The signal of interest contains noise and signal. The threshold detector 10 provides an output on signal line 16. The output on signal line 16 responds to the incoming signal on signal line 14. When the incoming signal exceeds a certain amplitude threshold, predetermined in one embodiment of the invention, the threshold detector 10 provides an output, in the form of an alarm signal, on signal line 16. The output of the threshold detector 10 on signal line 16 is fed to a buffer 24. The invention records the time at which the signal exceeds the threshold in the buffer 24.

The output from signal line 16 of threshold detector 10 is also sent to the input of frequency to voltage converter 36. The frequency to voltage converter 36 provides a voltage signal output 40 that is proportional to the frequency of the output from the threshold detector on signal line 16. An amplifier 38 amplifies the voltage signal output 40 to provide a threshold level control signal 42 back to threshold detector 10.

The threshold level control signal 42 is responsive to the voltage signal output 40 so that threshold detector 10 will be dynamically adjusted. If the output on signal line 16 is too low in frequency, control signal 42 will lower the threshold level of the threshold detector 10. By lowering the threshold level, more of the signal input from signal line 14 will pass through threshold detector 10 to signal line 16. Accordingly, the frequency of the threshold output on signal line 16 will increase.

However, if the output on signal line 16 is too high in frequency, control signal 42 will raise the threshold level of the threshold detector 10. By raising the threshold level, less of the signal input from signal line 14 will pass through threshold detector 10 to signal line 16. Accordingly, the frequency of the threshold output on signal line 16 will decrease. Those skilled in the art will recognize that the threshold level can be selected based upon the application and the desired results.

While operating the apparatus of the invention it is desirable to reject false alarms. If the threshold is set too low, the output on signal line 16 is replete with false alarms. The autocorrelation processing apparatus of the invention allows the weighing of false alarms by modifying the threshold. The invention improves the ability to detect a signal in the presence of noise.

The resultant detection approximates the ideal autocorrelation of the prior art. In one preferred embodiment of the invention, 5–10 pulses are detected. Those skilled in the art will appreciate that the method of the invention may be implemented either in software or hardware. In operation, a signal with noise enters the threshold detector 10 on line 14. The signal is fed to threshold detector 10, which in one embodiment is a comparator. The threshold detector 10 is set to give a very high false alarm rate, on the order of a few thousand per second. The threshold detector 10 is an amplitude threshold detector. The threshold detector is set low so as to continuously output noise on line 16. Functionally, the detector processes the analog signal and generates a pulse every time it crosses a predetermined amplitude threshold.

The duty cycle of the detector 5 is low. For example, even though the pulses occur 1000 times per second they are only 100 nanosecond pulses. The buffer 24 is enabled by the output of the threshold detector 10 on signal line 16.

In the preferred embodiment of the invention, the counter 12 is continuously free-running from a frequency reference. Clock 26 provides a clock signal 28 to counter 12 and counter 12 provides a continuous output to the buffer 24 via count line 18. The resolution of the counter 12 could, for example, be 16 bits running from a 10 megahertz clock. Those skilled in the art will recognize that the output of the counter 12 could be any divisible rate up to that of clock 26.

When the buffer 24 is enabled by the output on signal line 16, the value on count line 18 is simultaneously read into the buffer 24. This allows the buffer 24 to record the time at which each output from the threshold detector occurs.

Those skilled in the art will recognize that the buffer could be a circular first in, first out buffer, or other buffer suitable for post processing of autocorrelation events. The buffer 24 represents a record of the time at which occurrences of the pulses are detected by the threshold detector 10. Each entry in the buffer represents a time stamp of the occurrences. Those skilled in the art will further recognize that the cycle of the counter must exceed the expected time between pulses of interest in order for a meaningful time to be recorded.

The buffer 24 is configured to hold data representing up to about 100 or more events. In one preferred embodiment, pulses occur at a rate of between 10,000 and 25,000 pulses per second.

A processor 32 periodically processes the contents of the buffer 24 in order to autocorrelate the event time stamps recorded in the buffer. The processor ignores non periodic entries. The processor 32 starts with from 4 to 6 time stamps looking for time differentials that are approximately the same. Time differentials that are not within a predetermined window from a trend are considered noise. The processor provides a correlated output on signal line 34.

Having explained in detail the elements of the invention, the theory of operation of the invention will now be explained. During a time period, 10,000 real pulses and 1,000 bad noise pulses may be stored in the buffer 24. Each pulse may consist of either: (1) a noise pulse when there is not a real pulse, or (2) a real pulse when there is a real pulse, or (3) no pulse when there is a real pulse, the noise contracting a new pulse. Real pulses are not necessarily bigger than noise, even though the real pulses may be about equal in power to the noise.

The pulse width from pulse to pulse is assumed to be the same. Pulse width variations do not significantly affect the result.

The detected signal pulses may be of any amplitude, from zero or practically zero to much over the threshold. If the signal pulses are zero, they are undetectable. If the signal pulses are substantially over the threshold, they are detected. When the signal pulses are about the same as the noise and the noise happens to add to one of these pulses, the pulse is detected. If the noise happens to detract from one of the signal pulses, the detracted pulse is not detected. The method of the invention does not have to process more than about 15,000 to 20,000 pulses per second since only pulses that surpass the threshold are processed. The prior art, processes 10,000,000 pulses per second.

Random pulses are rarely periodic. The chance of having random pulses at precisely the same time intervals three times in a row is extremely small. If four pulses are not sufficient for a specific application, five or six may be used. In one example, a maximum rate of 25,000 pulses per second may be handled by a modern microprocessor, signal processor or a digital signal processor.

The method of the invention looks for periodicity in the input signal. Any pulse that does not fit that criteria is noise. The threshold detector is set to generate 1000 false alarms per second. This allows a smaller number of relevant pulses, and results in twice the sensitivity. The theoretical limit for sensitivity improvement is the square root of the number of pulses being detected. When looking for four pulses instead of one, the sensitivity is the square root of four, multiplied by the signal noise ratio.

The invention has been described herein in considerable detail in order to comply with the Patent Statutes and to provide those skilled in the art with the information needed to apply the novel principles and to construct and use such specialized components as are required. However, it is to be understood that the invention may be carried out by specifically different equipment and devices, and that various modifications, both as to the equipment details and operating procedures, may be accomplished without departing from the scope of the invention itself.

What is claimed is:

1. An autocorrelation signal processing apparatus comprising:
   (a) threshold detector means for detecting when a signal crosses a predetermined threshold, wherein the threshold detector means has a threshold detector output;
   (b) clock means for keeping time having a clock output;
   (c) counter means connected to the clock output having a counter output; and
   (d) buffer means for storing a predetermined number of time stamps, connected to the counter output and the threshold detector output.

2. The autocorrelation signal processing apparatus of claim 1 wherein the buffer means is a first in, first out circular buffer.

3. The autocorrelation signal processing apparatus of claim 1 wherein the threshold detector means further comprises a comparator.

4. The autocorrelation signal processing apparatus of claim 3 wherein the comparator outputs a detection alarm.

5. The autocorrelation signal processing apparatus of claim 1 wherein the threshold detector means outputs a detection alarm.

6. The autocorrelation signal processing apparatus of claim 4 wherein the comparator is set to produce a high false detection alarm rate.

7. The autocorrelation signal processing apparatus of claim 5 wherein the threshold detector means is set to produce a high false alarm rate.

8. The autocorrelation signal processing apparatus of claim 1 wherein the clock means is a synchronous clock.

9. The autocorrelation signal processing apparatus of claim 8 wherein the clock output has a frequency of at least 10 megahertz.

10. The autocorrelation signal processing apparatus of claim 1 wherein the counter means has a resolution of at least 16 bits.

11. The autocorrelation signal processing apparatus of claim 1 wherein the predetermined threshold is adjusted dynamically.

12. The autocorrelation signal processing apparatus of claim 1 further including:
   (a) a frequency to voltage converter connected to the threshold detector output wherein the frequency to voltage converter provides a voltage signal output which is proportional to the frequency of the threshold detector output; and
   (b) an amplifier to provide a threshold level to the threshold detector means responsive to the voltage signal output.

13. An autocorrelation method for finding a plurality of equally spaced pulses in a signal, wherein the signal contains pulses and noise, the autocorrelation method comprising the steps of:

(a) sensing a time at which the signal exceeds a predetermined threshold;

(b) storing the time in a buffer;

(c) processing the buffer for time differentials that are within a predetermined time from each other.

14. The autocorrelation method of claim 13 wherein the step of storing the time in a buffer comprises the step of storing the time in a first in, first out circular buffer.

15. The autocorrelation method of claim 13 further including the step of generating an alarm when the signal exceeds the predetermined threshold.

16. The autocorrelation method of claim 13 wherein the predetermined threshold is set to generate a high false alarm rate.

17. The autocorrelation method of claim 13 wherein the pulses occur at a rate greater than 10,000 pulses per second.

* * * * *